Aug. 10, 1943.  A. W. GELPCKE  2,326,453
SCREW ANCHOR
Filed Aug. 15, 1942
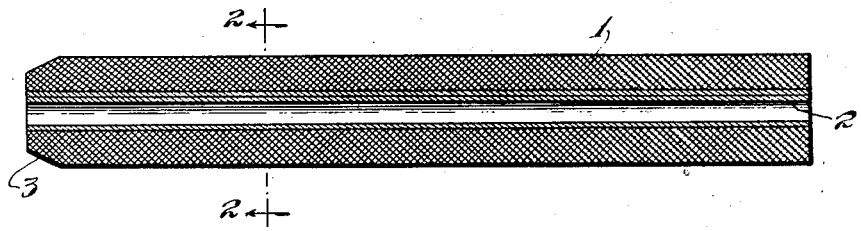
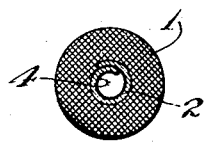   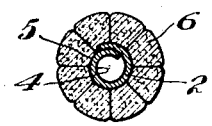
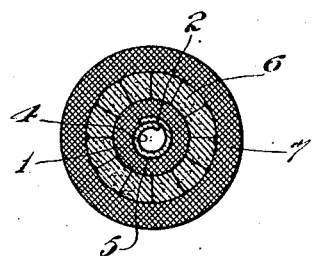
INVENTOR
Alfred W. Gelpcke
BY A. D. T. Libby
ATTORNEY Patented Aug. 10, 1943

2,326,453

UNITED STATES PATENT OFFICE 2,326,453

SCREW ANCHOR

Alfred W. Gelpcke, Brooklyn, N. Y., assignor to The Rawlplug Company, Inc., New York, N. Y.

Application August 15, 1942, Serial No. 455,001

9 Claims. (Cl. 85—2.4)

This invention relates to a special type of anchor for holding screws or fasteners in masonry of various kinds. The type of screw anchor to be herein described is what may be termed in general as of the fibre plug type. While numerous forms of such fibre screw anchors have been designed, I have found, by working with various types of such anchors over quite a period of years, that there is still room for improvement in such style of anchors, and the present specification is directed to describing a new screw anchor which has many advantages over prior-art constructions.

Heretofore fibre screw anchors have been made up in a sleeve type in which the sleeve has been composed of a bundle of longitudinally arranged fibre strips or cords held together with a suitable binder such as glue or the equivalent. Other sleeves or screw anchors have been made by braiding fibrous strands and treating them with a suitable binder. Still later this braided sleeve was used in combination with an inner sleeve of soft expansible metal such as lead, this last construction being set forth in Feldmar Patent 1,570,234, issued January 19, 1926.

I have found from experience that in the manufacture and use of a plug of the Feldmar type, in which the inner sleeve is continuous throughout, it is impossible to get the best holding or gripping effect with a given amount of material as compared with my improved type of screw anchor to be hereinafter described.

It is therefore the principal object of my invention to provide a screw anchor having many improved characteristics, all of which will be hereinafter set forth.

To attain the general object of my invention, I take a suitable piece of expansible material, preferably of relatively soft metal such as tin, zinc or lead foil or an alloy of these or other metals, of a suitable width and thickness to conform to the size of the screw anchor to be made, and draw this over a mandrel preferably circular in form so that the edges of the foil are in lapping relation; that is, the edges lap in some manner preferably as illustrated in Figure 2 for the purpose to be hereinafter described.

This strip is at least lubricated on what is to become the inner surface with a suitable lubricant that is rust-inhibitive so as to prevent the corrosion of the screws after they are screwed into place in the anchor, and also to permit the easy insertion and reinsertion of the screw. If the strip is lubricated on both sides there is an advantage in prelubricating the strip before it reaches the forming mandrel as an exact quantity of lubricant can be used, thereby preventing an over-supply of same which would have a tendency to squeeze through the braid when the screw is later applied to the anchor. Any excess quantity of lubricant thus getting on the outside of the exterior of the anchor would lessen its gripping hold on the masonry. Such a thing often happens in present expansion fasteners when the user is forced to rub some lubricant such as soap repeatedly onto the fastener or screw in order to permit complete insertion of the screw or fastener into the anchor. The lubricant may be one of several forms, but I have secured excellent results by using graphite mixed with petrolatum or paraffin. While the strip may be treated with a lubricant at the time of forming or manufacture of the plugs, lubricant may be applied to the strip during the manufacture of the strip material per se; or the lubricant may be embodied directly in the material of the strip itself, the main thing being, however, to have a surface which eliminates friction between the screw and the inner lining, and produces a slip between the inner lining and the outer sleeve.

Immediately after this lubricated strip is formed over the mandrel, a fibrous braid of suitable material, preferably being resilient such as jute, is braided over it. Preferably the braid is put on very tightly to form an outer sleeve so that the voids are reduced to a minimum, thereby permitting a larger amount of jute or fibrous material to be used for the same diameter of anchor. While the braiding is being applied over the inner sleeve or lining, it is simultaneously treated with a suitable binder such as glue or the equivalent. A plug made with a tight braid has the advantage of being much stronger in handling and can be driven into a tight hole without buckling or bending, which feature is very important when installing the plug in hard material or in holes made with undersized drills.

In the larger sizes of screw anchors of this type I may use outside the tightly braided sleeve which surrounds the inner lining, a plurality of parallel strands and then a second braided sleeve over these strands in order to obtain the diameter plug required. By using an inner lining or sleeve having a split longitudinally of its length and lubricated on both sides, the lapping edges of the lining will slip along on each other and the inner sleeve will slide under the outer fibrous sleeve as the screw expands this lining or sleeve, it being understood that the overlap is sufficient for any given size plug so that the screw that is used with the plug will not expand the inner sleeve to a point where the overlap ceases to exist or the opening between the edges of the lining is not so great as to permit the screw to come into contact with the fibrous strands of the outer sleeve.

With this construction maximum expansion of both sleeves takes place, the screw cutting at least a partial thread on the inner lining or sleeve, expanding this sleeve, together with the outer sleeve, into tight engagement with a drilled hole.

By using a lubricated inner sleeve as described, the ease of inserting the screw is greatly increased and the screw may be more easily removed and reinserted in the hole for making any changes on the fixture fastened by the screw.

In the annexed drawing:

Figure 1 illustrates a longitudinal sectional view through one form of screw anchor.

Figure 2 is a sectional view of Figure 1.

Figure 3 is a view of a modified form of construction.

Figure 4 is a view of a further modified form showing a plurality of braids forming the outer sleeve.

In the different views, 1 is a braiding of fibrous material forming the outer sleeve which is preferably tightly woven over the inner sleeve or metal lining 2 having lapping edges. These lapping edges are sufficient so that for any given size plug the expansion, when a screw is inserted into the anchor, still leaves some lapping so that the screw will not come in contact with the fibrous strands of the outer sleeve.

In Figure 2 the inner surface of the lining is illustrated as having a lubricating coating 4 thereover. This is exaggerated in the drawing in order to illustrate it.

In Figure 3 the outer sleeve is made up of parallel strands of fibrous material and both surfaces of the inner sleeve are illustrated as having a lubricating coating 4 and 5.

In Figure 4 the outer sleeve is made up of a plurality of layers, the inner layer 1 being braided, on which is applied a layer of parallel strands 6 as illustrated in Figure 3, and over these parallel strands is applied a layer 7 of braided fibrous material. The construction shown in Figure 4 would be used preferably on the larger sizes of screw anchors, and on these larger sizes it is preferable to form one end of the anchor with a bevel 3 as illustrated in Figure 1, or both ends may be beveled.

While in Figure 2 I have shown the inner lining as having a lubricating coating on its inner surface, it will be understood that I prefer to also use a lubricating coating on the outer surface of the lining, the same as illustrated in Figure 3.

While the foregoing specification refers generally to the use of the anchor described herein in connection with screws, some other types of fasteners may be used in certain cases, such as nails or other pointed devices, as the liner will permit easy driving of the fastener and the tight braiding will give a good holding power when expanded. Furthermore, while I prefer the overlapping construction of Figure 2, there will be cases where the edges of the inner liner may be brought into abutting relation, especially where the braiding is put on tightly and the holes in the masonry are proper so that substantially the full effect of the lubricated liner can be obtained between the outer fibrous covering and the fastener, whether it be a screw, nail or other kind of device.

I have found, after many tests, that such an anchor as herein described is far superior to anything heretofore produced; that is to say, it is stiffer and can be driven into a tight-fitting hole more easily than prior anchors, and its holding power is greater with an easier application of the screw.

What I claim is:

1. A screw anchor comprising an outer sleeve of fibrous material and an inner lining of relatively soft metal, the lining being split longitudinally of its length with the split edges normally lying in lapping relationship, at least the inner surface of the lining being treated with a lubricant.

2. A screw anchor comprising an outer sleeve of fibrous material and an inner lining over which the outer sleeve is tightly positioned, the lining being split longitudinally with the split edges slidable one on the other without bringing the outer sleeve into direct contact with a screw which may be inserted into the anchor, at least the inner surface of the lining being treated with a lubricant.

3. A screw anchor comprising an outer sleeve of fibrous material and an inner lining of relatively soft metal, the lining being split longitudinally with the split edges positioned to slide one on the other without bringing the outer sleeve into direct engagement with a screw which may be inserted into the anchor, the lining having both its inner and outer surfaces treated with a suitable lubricant.

4. A screw anchor comprising an outer sleeve of fibrous material and an inner lining of relatively soft metal over which the outer sleeve is tightly braided, the lining being split longitudinally with the split edges overlapping sufficiently so the insertion of a screw within the lining will not spread the lining enough to allow the screw to engage the outer sleeve, the lining having its surfaces treated with a rust-inhibiting lubricant.

5. A screw anchor comprising an outer sleeve composed of a plurality of layers of fibrous material and an inner lining of expansible material which will allow a thread to be cut therein when a screw is forced into the lining, the lining being split longitudinally with the split edges slidable one on the other, the lining having its surfaces treated with a suitable lubricant.

6. A screw anchor comprising an outer sleeve of fibrous material and an inner lining of expansible material, the lining being split longitudinally with the split edges slidable one on the other without exposing the outer sleeve to the direct action of a screw, the lining having at least its inner surface treated with a rust-inhibiting lubricant.

7. A screw anchor composed of an inner and an outer sleeve, the outer sleeve being of resilient fibrous material, the inner sleeve being split longitudinally and also being substantially circular in cross-section with edges normally overlapping preferably to an extent such that when the screw is all the way into the anchor the threads of the screw will not come in contact with the outer sleeve, at least the inner surface of the inner sleeve being treated with a suitable lubricant.

8. An anchor for a fastener comprising an outer sleeve of fibrous material and an inner lining of relatively soft expansible material, the lining being split longitudinally of its length with the split edges normally lying in lapping relationship and slidable one on the other, at least the inner surface of the lining being treated with a lubricant.

9. An anchor for a fastener comprising an outer sleeve of fibrous material and an inner lining of relatively soft expansible material, the lining being split longitudinally of its length with the two split edges normally lying in close juxtaposition, the lining having its surfaces treated with a suitable lubricant.

ALFRED W. GELPCKE.